(12) United States Patent
Skidmore et al.

(10) Patent No.: US 10,796,477 B2
(45) Date of Patent: Oct. 6, 2020

(54) METHODS, DEVICES, AND SYSTEMS FOR DETERMINING FIELD OF VIEW AND PRODUCING AUGMENTED REALITY

(71) Applicant: EDX Technologies, Inc., Austin, TX (US)

(72) Inventors: Roger Ray Skidmore, Austin, TX (US); Eric Reifsnider, Raleigh, NC (US)

(73) Assignee: EDX Technologies, Inc., Austin, TX (US)

( * ) Notice: Subject to any disclaimer, the term of this patent is extended or adjusted under 35 U.S.C. 154(b) by 0 days.

(21) Appl. No.: 16/011,813

(22) Filed: Jun. 19, 2018

(65) Prior Publication Data

US 2018/0365884 A1 Dec. 20, 2018

Related U.S. Application Data

(60) Provisional application No. 62/522,140, filed on Jun. 20, 2017.

(51) Int. Cl.
| | |
|---|---|
| *G06T 15/20* | (2011.01) |
| *G06T 7/73* | (2017.01) |
| *G06T 19/00* | (2011.01) |
| *G06F 3/01* | (2006.01) |
| *G06T 7/254* | (2017.01) |
| *G06F 3/16* | (2006.01) |

(52) U.S. Cl.
CPC .............. *G06T 15/20* (2013.01); *G06F 3/011* (2013.01); *G06F 3/016* (2013.01); *G06T 7/254* (2017.01); *G06T 7/74* (2017.01); *G06T 19/006* (2013.01); *G06F 3/16* (2013.01); *G06F 3/167* (2013.01); *G06T 2207/10004* (2013.01); *G06T 2207/10016* (2013.01); *G06T 2207/30244* (2013.01)

(58) Field of Classification Search
CPC ........................................................ G06T 7/74
USPC .......................................................... 345/633
See application file for complete search history.

(56) References Cited

U.S. PATENT DOCUMENTS

| | | | | |
|---|---|---|---|---|
| 8,553,037 B2* | 10/2013 | Smith | ..................... | G06T 13/40 345/473 |
| 9,939,381 B1* | 4/2018 | Kimmel | ............. | G01N 21/6458 |
| 2004/0215689 A1* | 10/2004 | Dooley | ................... | G06F 3/017 709/200 |
| 2005/0018066 A1* | 1/2005 | Hofer | ................. | H04N 5/23212 348/333.02 |
| 2006/0061551 A1* | 3/2006 | Fateh | ..................... | G06F 1/1626 345/158 |
| 2006/0071945 A1* | 4/2006 | Anabuki | ............... | G06F 3/0325 345/633 |
| 2010/0067765 A1* | 3/2010 | Buther | ................... | A61B 6/032 382/131 |
| 2014/0267397 A1* | 9/2014 | Wagner | ................. | G06T 19/006 345/633 |
| 2014/0272807 A1* | 9/2014 | Guenther | ............. | F41G 3/2605 434/19 |
| 2015/0163406 A1* | 6/2015 | Laroia | .................... | G02B 27/58 348/208.1 |

(Continued)

*Primary Examiner* — Javid A Amini
(74) *Attorney, Agent, or Firm* — W&C IP

(57) ABSTRACT

A camera's field of view is determined using image data and motion sensor data. Accurate augmented reality representations are provided based on the determined field of view in an absence of a priori knowledge of the camera's field of view.

14 Claims, 9 Drawing Sheets

(56) References Cited

U.S. PATENT DOCUMENTS

| | | | |
|---|---|---|---|
| 2015/0207987 A1* | 7/2015 | Troy | G01S 17/46 348/142 |
| 2015/0332506 A1* | 11/2015 | Aratani | G06T 19/00 345/633 |
| 2015/0356789 A1* | 12/2015 | Komatsu | G06T 11/60 345/633 |
| 2016/0122038 A1* | 5/2016 | Fleischman | G06T 7/73 701/2 |
| 2016/0189391 A1* | 6/2016 | Demartin | G08B 13/19602 382/103 |
| 2016/0325680 A1* | 11/2016 | Curtis | B60R 1/00 |
| 2017/0102467 A1* | 4/2017 | Nielsen | G01S 19/14 |
| 2017/0238846 A1* | 8/2017 | Xu | G06T 7/11 |
| 2017/0278289 A1* | 9/2017 | Marino | G06T 7/44 |
| 2017/0357327 A1* | 12/2017 | Dimitrov | G06F 3/012 |
| 2018/0091750 A1* | 3/2018 | Gutierrez | H01L 27/146 |
| 2018/0140265 A1* | 5/2018 | Chu | A61N 5/1049 |
| 2018/0157269 A1* | 6/2018 | Prasad | B60T 7/12 |

\* cited by examiner

METHODS, DEVICES, AND SYSTEMS FOR DETERMINING FIELD OF VIEW AND PRODUCING AUGMENTED REALITY

CROSS-REFERENCE TO RELATED APPLICATIONS

This application claims the benefit of U.S. Provisional Patent Application No. 62/522,140, filed Jun. 20, 2017, the complete contents of which are herein incorporated by reference.

FIELD OF THE INVENTION

The invention generally relates to image processing techniques, photography, and augmented reality. In some aspects, embodiments of the invention relate to image processing and field of view determinations that permit or improve augmented reality methods and systems.

BACKGROUND

Cameras are everywhere. The proliferation of mobile electronic devices such as smartphones has had the effect that many ordinary individuals who in prior years only used cameras for special occasions like birthdays now carry around a camera in their pocket. Multipurpose mobile electronic devices such as smartphones and tablets very frequently have one if not multiple built-in cameras that accompany other hardware like a display and speakers. The market for multipurpose devices like smartphones is considerable, and many different companies use propriety cameras or specialized camera configurations as a means for differentiating their own products from those of competitors. As a result, the consumer marketplace contains hundreds of different cameras with their own separate and unique specifications. Camera specifications differ not only between different companies/brands (e.g., Apple and Samsung), but also between different product series of the same company/brand (e.g., Samsung Galaxy and Samsung Note), and between different product versions within the same series (e.g., Samsung Galaxy S6 and Samsung Galaxy S7).

Because any one single company controls only a fraction of the mobile device market, and because any one specific mobile device model of that single company represents only a fraction of that fraction, it is not economically savvy for software developers to develop software products which cater only to a specific mobile device model, specific mobile device series, or even a specific company. Rather, the common industry trend is for software developers to create software products which are compatible with a wide variety of disparate hardware devices. However, a problem arises when the functionality or performance of a software product is highly dependent on hardware specifications like camera configurations which are enormously diverse across the market. Augmented reality products, for instance, can be heavily dependent on camera hardware. Augmented reality attempts to augment a real world experience, and to do this the devices or systems providing the augmentation must have an "understanding" of real world surroundings. Such "understanding" is most often obtained using one or more cameras which capture images or videos of the surroundings. Other sensors such as locations sensors (e.g., GPS devices) may also be used to collect data used as input to the logic decisions which ultimately produce an augmented reality experience. Because of the diversity of camera specifications, however, it becomes problematic for an augmented reality device to "understand" or characterize image or video data that is received from the camera.

One solution to the diversity of cameras and camera specifications in the market is to maintain a database with all specifications for all cameras on the market. This solution, however, is highly impractical. Specification data may not be easy or even possible to obtain for some proprietary camera hardware, and the annual releases of a variety of new devices with new hardware specifications by industry leaders and newcomers alike means keeping such a database up to date could prove impossible or overly burdensome. Therefore solutions are needed which permit the use of a wide variety of different cameras without reliance on detailed camera specifications being supplied from the manufacturers.

SUMMARY

Exemplary embodiments provide methods and apparatuses which are configured to determine the field of view of a camera for which the field of view was not previously known. Field of view may be determined using a limited set of inputs, including a video feed from the camera and motion data from sensors common among modern smartphones, e.g., accelerometers.

Using knowledge of the field of view of a real world camera, this field of view may be applied to a virtual world which creates a virtual landscape corresponding with a real world landscape. For instance, a virtual model of New York City could have many of the same general dimensions, proportions, and other qualities of the real New York City. The virtual model also contains virtual objects which may or may not correspond with the real world. For instance, a virtual model of New York City may have a virtual building that resembles the Empire State Building, and it may also have a virtual hot dog stand at the corner of Broadway and $7^{th}$ Street which does not correspond with any real hot dog stand. For purposes of the invention, the virtual model may simply be virtual model data stored in a memory repository. Embodiments of the invention, using the field of view that was determined, select particular virtual objects to represent as augmentations to a user. So, for instance, just the virtual hot dog stand may be shown to a user if the user is looking at the real world corner of Broadway and $7^{th}$ Street. In such manner augmented realities with accurately delivered (e.g., positioned) augmentations are made possible despite initially lacking the field of view of the camera being used to understand the real world surroundings of a user.

By comparing an angular rate of motion estimated from the video stream and an angular rate of motion estimated from accelerometers the actual field of view of a camera may be calculated.

According to a further feature of some embodiments, systems include user interactive features which can contribute to the determination of field of view. Coaching the user to move the camera in predetermined movement paths or patterns while capturing the video stream and motion sensor data is an advantageous feature of some embodiments, helping to avoid scenarios where assumptions of the system algorithms may break down and result in an inaccurate field of view determination. For instance, an output instruction may be provided to a user to pan the camera to the side or up and down. Some devices may alternatively have automated features and electronic devices (e.g., servo motors)

which provide for camera panning. Other user interactive features may also be provided.

DETAILED DESCRIPTION

Figure 1:
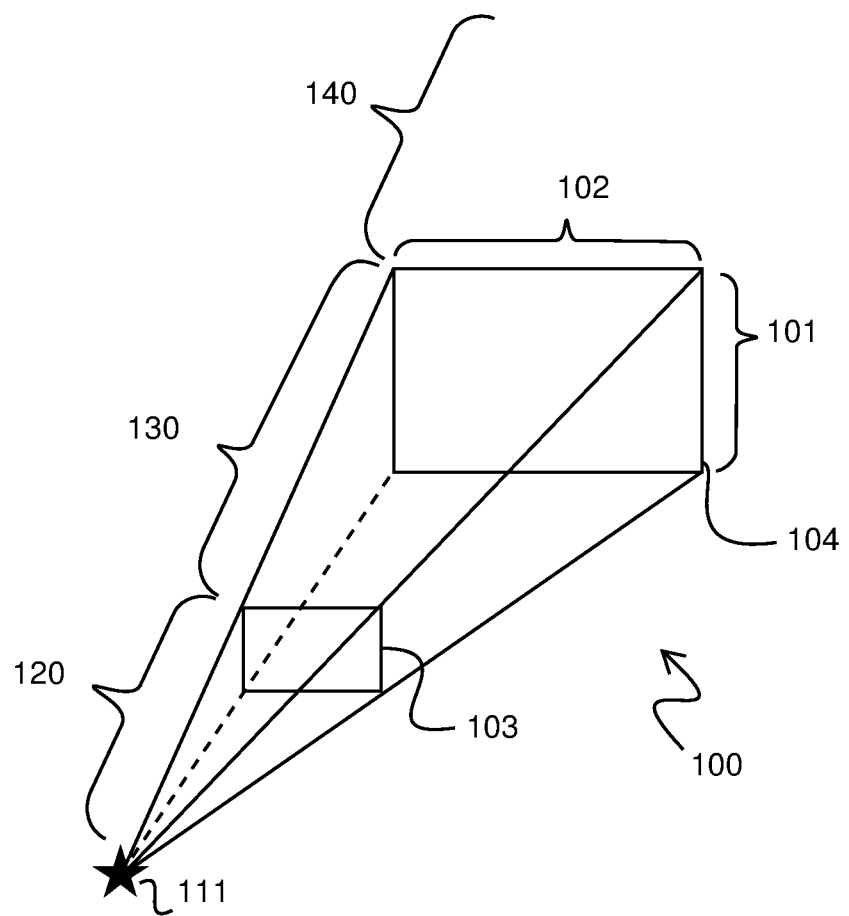
FIG. 1 is a diagram of a frustum.

As used herein, "augmented reality", or "AR", is a direct or indirect experience of a physical, real-world environment in which one or more elements are augmented by computer-generated sensory output such as but not limited to sound, video, graphics, or haptic feedback. Augmented reality is frequently but not necessarily live/in substantially real time. It is related to a more general concept called "mediated reality", in which a view of reality is modified (e.g., diminished or augmented) by a computer. The general intent is to enhance one's natural perception of reality (e.g., as perceived by their senses without external devices). In contrast to mediated reality, "virtual reality" replaces the real world with a simulated one. Augmentation is conventionally in real-time and in semantic context with environmental elements. For example, many Americans are accustomed to augmented reality when watching American football on a television. A football game as captured by video cameras is a real world view. However, the broadcasting company frequently augments the recorded image of the real world view with the line of scrimmage and first down markers on the field. The line and markers do not exist in reality, but rather they are virtual augmentations that are added to the real world view. As another example, in televised Olympic races, moving virtual lines can be superimposed on tracks and swimming pools to represent the position of a runner or swimmer keeping pace with the world record in the event. Augmented reality that is not in in real-time can be, for example, superimposing the line of scrimmage over the image of a football match that is being displayed after the match has already taken place. Augmented reality permits otherwise imperceptible information about the environment and its objects to supplement (e.g., be overlaid on) a view or image of the real world.

Augmented reality differs from a heads-up display, or HUD. A HUD displays virtual objects overlaid onto a view of the real world, but the virtual objects are not associated visually with elements of that real world view. Instead, the HUD objects are associated with the physical device that is used to display the HUD, such as a reflective window or a smartphone. A HUD moves with the display and not with the real world view. As a result, the virtual objects of the HUD are not perceived as being integrated into the real world view as much as purely being an overlay. When a display pans left, for example, a HUD moves left with the display. In contrast, augmentations (of an augmented reality) would move right with the real world view. Embodiments of the invention are primarily concerned with augmented reality as opposed to HUDs, although HUDs may be used in conjunction with augmented reality.

For a concrete example distinguishing augmented reality from HUDs, consider again televised American football. A line of scrimmage is shown as an augmentation (augmented reality). The line appears in relation to the field and the players within the real world view. If a camera pans left to look at a coach on a sideline, the center of the field, the players, and the virtual scrimmage line all move off to the right hand side of the view where they will eventually exit the field of view if the camera pans sufficiently to the left. In contrast to the line of scrimmage, scores of the competing teams are also usually displayed on televisions. The scores are typically superimposed on the view of the game in a top or bottom corner of the television screen. The scores always maintain a corner position in the television. When a camera pans left from the players in the center of the field to a coach on the sideline, the scores in essence move left along with the field of view, so that they maintain the exact same position on the display. The positions of the scores have no associative relationship to the positions of objects in the real world view. In this way, the scores behave like the virtual objects of a HUD as opposed to "augmentations" as generally used herein.

A camera includes at least one lens and an image sensor. The lens focuses light, aligns it, and produces a round area of light on an image sensor. Image sensors are typically rectangular in shape, with the result that the round area of light from the lens is cropped to a standard image format. A lens may be a zoom lens or a fixed focal length lens. At the time of writing this application, most mobile multipurpose electronic devices have fixed focal length lens. However, embodiments of the invention may be suited for either type of lens. Lenses may be categorized according to the range of their focal length. Three standard classifications are wide angle, normal, and telephoto. Categorization depends on focal length (or focal length range) and lens speeds.

Field of view (FOV) is the extent of the observable world seen at a given moment, e.g., by a person or by a camera. In photography, the term angle of view (AOV) is more common but can be used interchangeably with the term field of view (FOV).

Angle of view is one significant camera configuration. A camera is only able to capture an image or video (e.g., a series of images) containing an object if that object is within the angle of view of the camera. Because camera lenses are typically round, the angle of view of a lens can typically be expressed as a single angle measure which will be same regardless of whether the angle is measured horizontally, vertically, or diagonally. Angle of view of a camera, however, is also limited by the sensor which crops the image transmitted by the lens. The angle of view of a camera may be given horizontally, vertically, and/or diagonally. If only a single value is given with respect to a camera's FOV, it may refer to a horizontal angle of view.

Angle of view is related to focal length. Smaller focal lengths allow wider angles of view. Conversely, larger focal lengths result in narrower angles of view. Unaided vision of a human tends to have an AOV of about 45°. "Normal" lenses are intended to replicate the qualities of natural vision and therefore also tend to have an AOV of about 45°.

Angle of view is also dependent on sensor size. Sensor size and angle of view are positively correlated. A larger sensor size means a larger angle of view. A smaller sensor size means a smaller angle of view. For a normal lens, FOV (or AOV) can be calculated as $$FOV = 2 * \tan^{-1}\left(\frac{d}{2f}\right)$$

where d is the sensor size and f is the focal length.

In the context of digital spaces (e.g., virtual reality worlds), field of view (FOV) is frequently discussed according to a viewing frustum. FIG. 1 shows an example of a viewing frustum 100, referred to herein simply as "frustum." Because viewports are frequently rectangular, the frustum is usually a truncated four-sided (e.g., rectangular) pyramid. For viewports of other shapes (e.g., circular), the frustum may have a different base shape (e.g., a cone). The boundaries or edges of a frustum 100 may be defined according to a vertical field of view 101 (an angle, usually expressed in degrees), a horizontal field of view (an angle, usually expressed in degrees), a near limit (a distance or position), and a far limit (a distance or position). The near limit is given by a near clip plane 103 of the frustum. Similarly, the far limit is given by a far clip plane 104 of the frustum. Besides these boundaries, a frustum also generally includes position and orientation. In short, an exemplary frustum includes position, orientation, field of view (horizontal, vertical, and/or diagonal), and near and far limits. Position and orientation may be referred to collectively as "pose."

The frustum 100 of FIG. 1 corresponds with the view from a camera or viewpoint 111. A real world setting will involve a camera, whereas a virtual world setting will involve a viewpoint (e.g., a virtual camera). In a digital space, virtual objects falling in the region 120 between the viewpoint 111 and the near clip plane 103 are not displayed. Likewise, virtual objects falling in the region 140 which are beyond the far clip plane 104 are not displayed. Only virtual objects within the frustum 100, that is to say within the region between the near and far clip planes 103 and 104 and within the horizontal FOV 102 and vertical FOV 101, are candidates for representation by augmentation. This differs from a real world view of a camera, where visibility of an object is generally based on horizontal FOV 102 and vertical FOV 101 only. That is to say, for a camera in a real world setting, real objects which are within the horizontal FOV 102 and vertical FOV 101 are generally visible. In a digital space, a near clip plane 103 may be set to zero (i.e., at the viewpoint) and a far clip plane 104 may be set to infinity or substantially infinite distance in order to approximate the view from a camera looking upon the real world. However, omission of objects closer than a virtual camera's near clipping plane (which would ordinarily be out of focus for a real camera), and of objects beyond its far clipping plane (which would for a real camera appear so tiny as to be effectively invisible unless their physical dimensions are quite large) is performed as an efficiency gain in a virtual system—in fact a virtual camera's near clipping plane may be placed arbitrarily close, and the far clipping plane arbitrarily far, if an augmented reality system is willing to do the extra processing required to render the resulting increased volume of the frustum. It should be understood that obstruction of one object by another as well as object diminution at great camera-to-object (viewpoint-to-object) distances may result in reducing or eliminating visibility of an object even though it technically exists within the frustum 100.

Augmented reality involves defining spatial relationships between virtual objects and real objects, and then making the virtual objects apparent to a user of the augmented reality system in such a way as to combine real and virtual objects. For example a visual augmented reality display could use virtual and real objects, and their defined spatial relationships, to generate a combined visual display in the form of a live streaming video (presenting real objects) overlaid with representations of the virtual objects. A spatial relationship between two objects (either or both of which may be virtual or real) may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Without correct reckoning of the spatial relationships in such a system, errors in the presentation of the system's output to the user can cause the system to be unusable, e.g. virtual objects appear out of place and therefore are not useful. An example is a virtual visual label that should label one building, but is erroneously shown overlaid onto a different building.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects. The perspective of the camera includes the position of the camera, the orientation of the camera, and its field of view.

The need for a correctly matched perspective between virtual and real worlds means that in order to provide an accurate spatial relationship between virtual objects and real objects in an augmented reality output, it is necessary to determine the field of view of the real camera so that the virtual field of view can be matched to the real field of view.

Existing augmented reality (AR) products in the marketplace today make use of dedicated hardware for which the camera field of view is known a priori before the augmented reality software algorithm is written. However, these solutions cannot be used on any hardware other than the dedicated hardware for which the AR system is pre-calibrated. A traditional AR system which does not have a priori knowledge of a camera's field of view has a problem of determining which virtual objects are candidates for presenting augmentation (e.g., display). To illustrate this problem, consider the following scenario discussed in connection with FIGS. 2-6.

Figure 2:
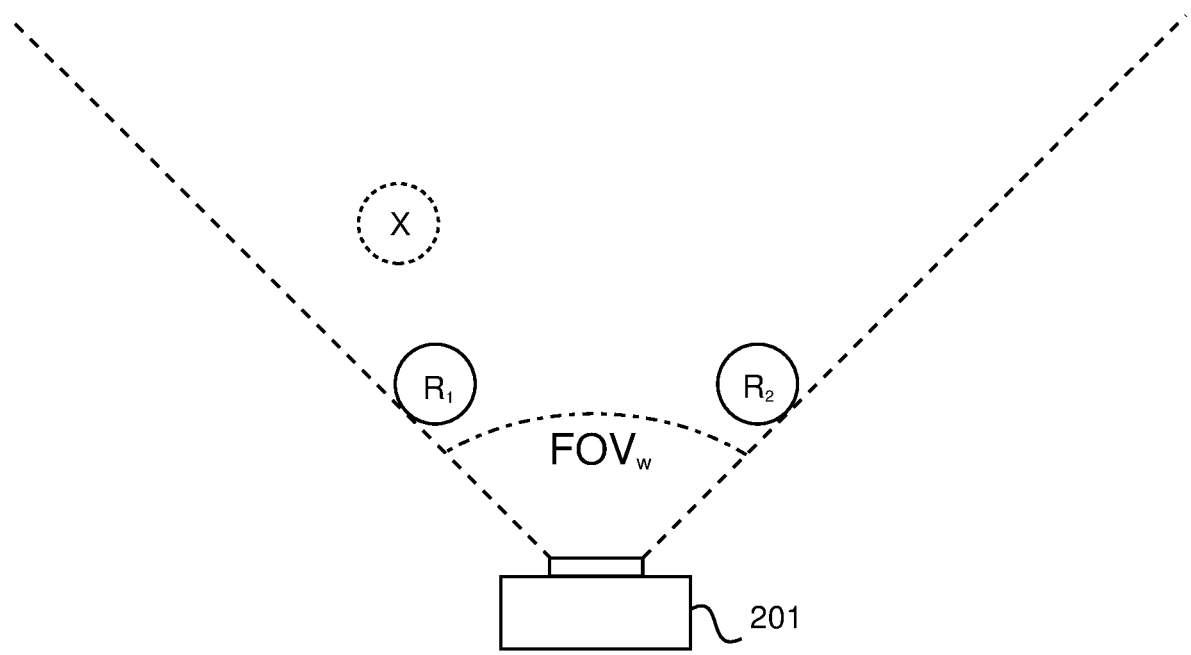
FIG. 2 is a diagram illustrating a relatively wide field of view that encompasses two real objects and a nearby virtual object.

FIG. 2 shows a camera 201 with a relatively wide field of view, $FOV_w$. At the left and right boundaries of the $FOV_w$, real objects $R_1$ and $R_2$ are visible. Object X is a virtual object which would not appear to the camera 201 but which is desirable to show in an augmented reality output with the spatial relationship (relative to $R_1$, $R_2$, and camera 201) depicted in FIG. 2. The camera, at its most basic level of functionality, is not "aware" of the physical presence of $R_1$ or $R_2$ despite having visibility of these objects. It is also not "aware" that, based on its position, viewing direction, and field of view, it would be appropriate to also perceive virtual object X.

Figure 3:
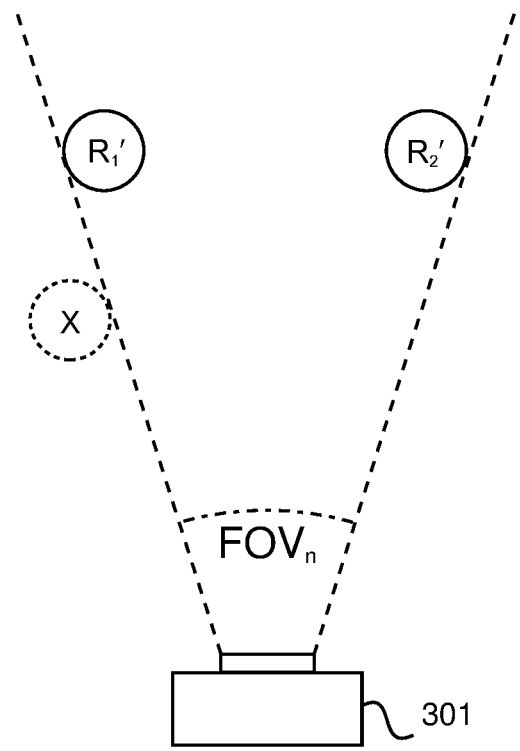
FIG. 3 is a diagram illustrating a relatively narrow field of view that encompasses two real objects but not a nearby virtual object.

FIG. 3, on the other hand, shows a camera 301 with a relatively narrow field of view, $FOV_n$. Assume that cameras 201 and 301 have the exact same positions and orientations. Further assume that virtual object X has the same position. Accordingly, it is safe to assume that an identical spatial relationship exists between camera 201 and virtual object X as exists between camera 301 and virtual object X. At the left and right boundaries of the $FOV_n$ of camera 301 are real objects $R_1'$ and $R_2'$. Camera 301, just like camera 201, is assumed for this illustration to have no detection or object recognition capabilities and therefore has no "awareness" of the physical presence of $R_1'$ and $R_2'$. It is also not "aware" that, based on its position, orientation, and field of view, it would be inappropriate to perceive virtual object X, since virtual object X lies outside of the field of view of the camera 301.

Figure 4:
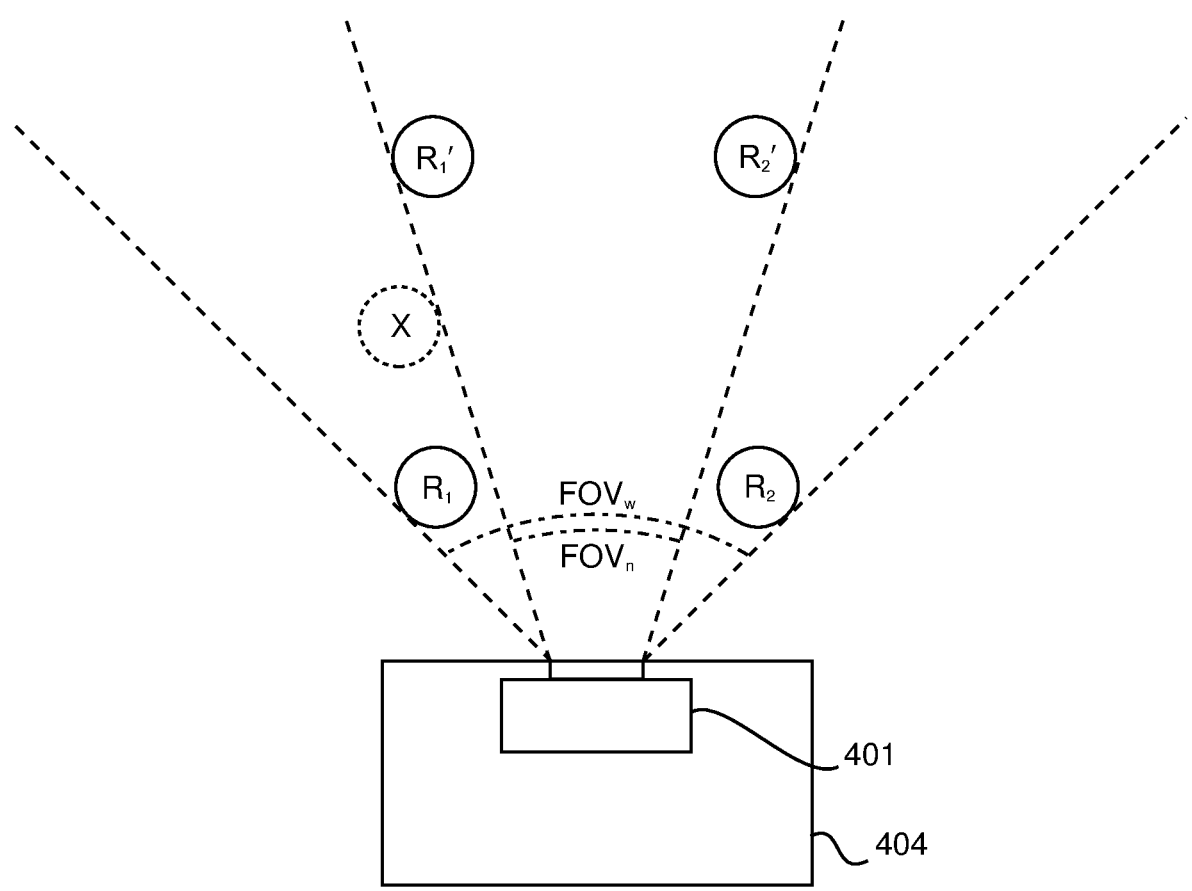
FIG. 4 is a diagram of an augmented reality (AR) device that may have either the relatively wide field of view from FIG. 2 or the relatively narrow field of view from FIG. 3.

Referring now to FIG. 4, consider next an augmented reality (AR) device 404 that includes a camera 401 which is identical in all characteristics to either camera 201 or 301, but the AR device 404 is not preconfigured to have a priori knowledge of camera 401's configurations such as its field of view. Even if there are only two possibilities, $FOV_w$ or $FOV_n$, the system still needs a way to determine which field of view actually applies to camera 401 in order to provide accurate augmentations. FIG. 4 shows the combination of the two possibilities, that is to say a $FOV_w$ configuration and a $FOV_n$ configuration. If the virtual object X is within the actual field of view, the AR device 404 should represent the virtual object as an augmentation perceptible to a user. If the virtual object X is outside the actual field of view, the AR device should not represent the virtual object as an augmentation perceptible to the user. In short, the AR device must make a determination as to whether or not to represent virtual object X with an augmentation, and such determination is dependent on determining the actual field of view of the AR device's camera 401.

Figure 5:
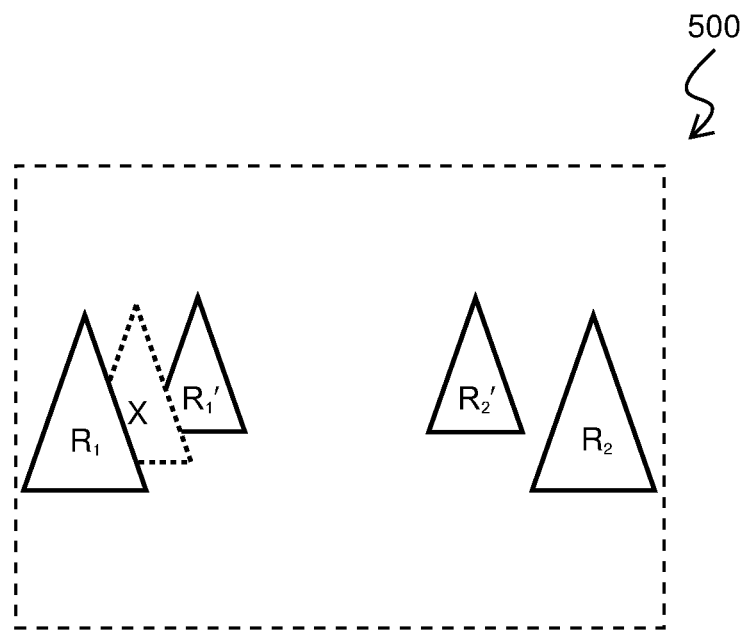
FIG. 5 is an image corresponding with the relatively wide field of view in FIG. 2.
Figure 6:
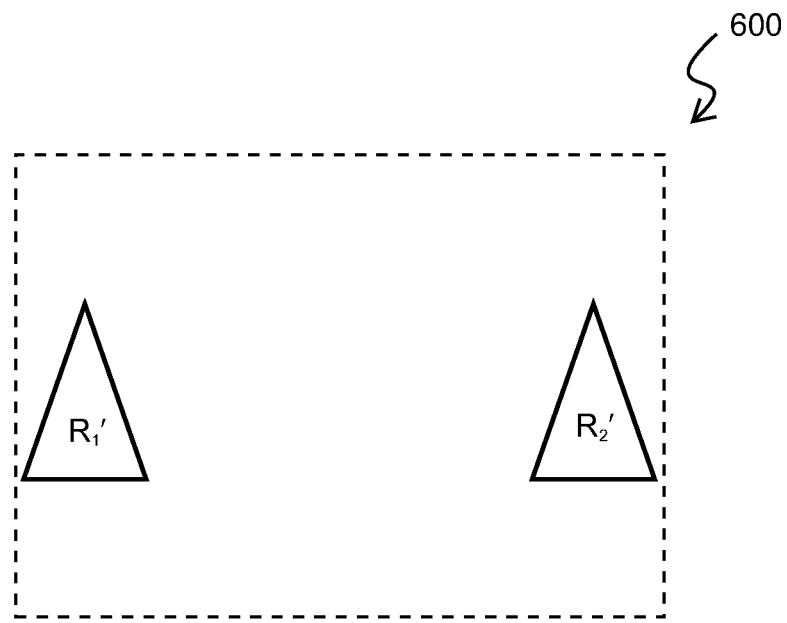
FIG. 6 is an image corresponding with the relatively narrow field of view in FIG. 3.

FIGS. 5 and 6 show visual outputs that may be displayed by the AR device 404. FIG. 5 shows a proper image or video 500 if the actual field of view of camera 401 is $FOV_w$. Objects $R_1$, $R_2$, $R_1'$, and $R_2'$ are shown be default because they are real world objects. The real world objects may be displayed as part of a live video stream from the camera 401. Alternatively, if the AR device 404 is a see-through HMD, the real world objects may be visible simply by light reflecting off of the objects and passing through the HMD to the user's eyes. In contrast, the virtual object X can only be represented to the user as an augmentation. FIG. 5 shows a virtual object X augmentation represented accurately, meaning it has the correct spatial relationships (e.g., topological relation, distance relation, and directional relation) with the real world objects in the image or video 500.

On the other hand, FIG. 6 shows a proper image or video 600 if the actual field of view of camera 401 is $FOV_n$. Objects $R_1'$ and $R_2'$ are shown be default because they are real world objects. The real world objects may be displayed as part of a live video stream from the camera 401. Alternatively, if the AR device 404 is a see-through HMD, the real world objects may be visible simply by light reflecting off the objects and passing through the HMD to the user's eyes. Virtual object X is not represented as an augmentation because it lies outside the field of the view of the camera 401.

Exemplary embodiments of the invention comprise the necessary means, structural and/or functional, for an AR device or system such as AR device 404 of FIG. 4 to be configured to determine the actual FOV of the camera (or cameras) used for the augmented reality experience without a priori knowledge of the camera's field of view.

Figure 7A:
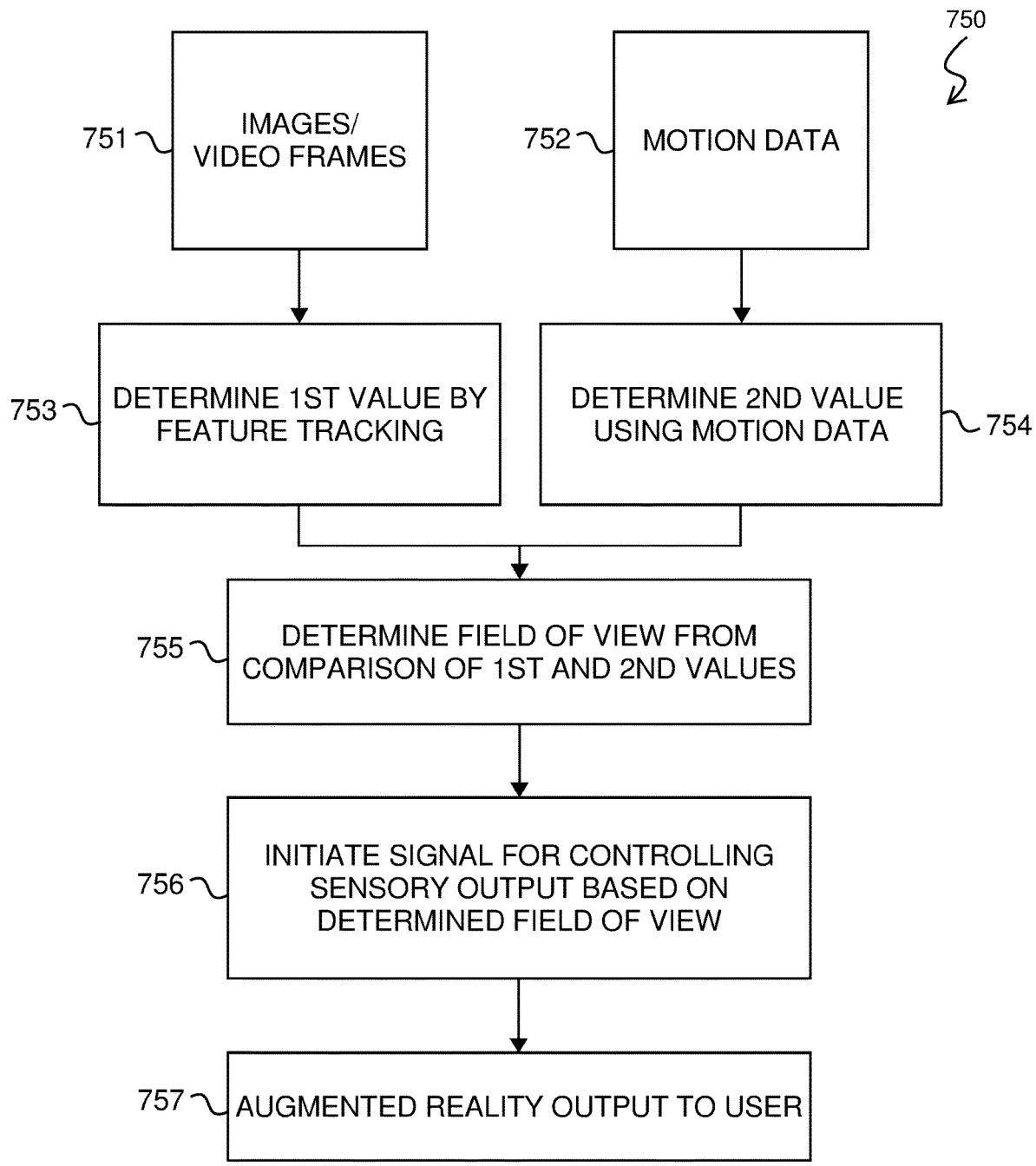
FIG. 7A is a flow diagram for an exemplary method of determining a field of view for a camera.

FIG. 7A shows an exemplary method 750 for determining a field of view and providing an augmented reality. The method 750 may involve determining a camera's field of view interactively with a user. Real time video is captured by a camera the field of view of which needs to be determined (block 751). A first value describing a change in the camera's position and/or orientation (e.g., rate of motion of the camera) is determined from processing the video stream (block 753). This may be achieved with one or more feature extraction and tracking algorithms. An exemplary algorithm identifies particular features of the images and observes the changes in their positions relative to the frame. Detecting these changes as a function of time yields a first value for the camera's rate of motion. During the determination at block 753, a user may be instructed to move the camera to ensure that there is in fact motion to detect.

While the rate of motion of the camera is determined from processing of the input video stream (block 753), the method 750 also processes data from attached motion sensors (block 752) to determine a second value describing a change in the camera's position and/or orientation (block 754). Accelerometers are suitable motion sensors that may be used to collect motion data 752. Accelerometers are also common to most smartphones, with the result that sensor hardware is readily available when determining field of view of smartphone cameras. In the case of vertical movement as well as in the case of horizontal movement, it is straightforward to track the actual change in direction of the camera over time, using translational and rotational accelerometers commonly available on smartphones and other mobile devices.

By comparing the first and second values (e.g., by comparing the angular rate of motion estimated from the video stream and the angular rate of motion estimated from the accelerometers), the actual field of view is calculated (block 755). Accurate determinate of the field of view enables accurate selection of virtual reality sensory outputs the user should be supplied, and conversely which virtual reality effects the user should not be supplied. A signal (or signals) is (are) initiated for controlling sensor output for the user based on the determined field of view (block 756). The signals are usable by an actual output device such as a smartphone or dedicate AR device or headset to produce an augmented reality for the user (block 757).

Figure 7B:
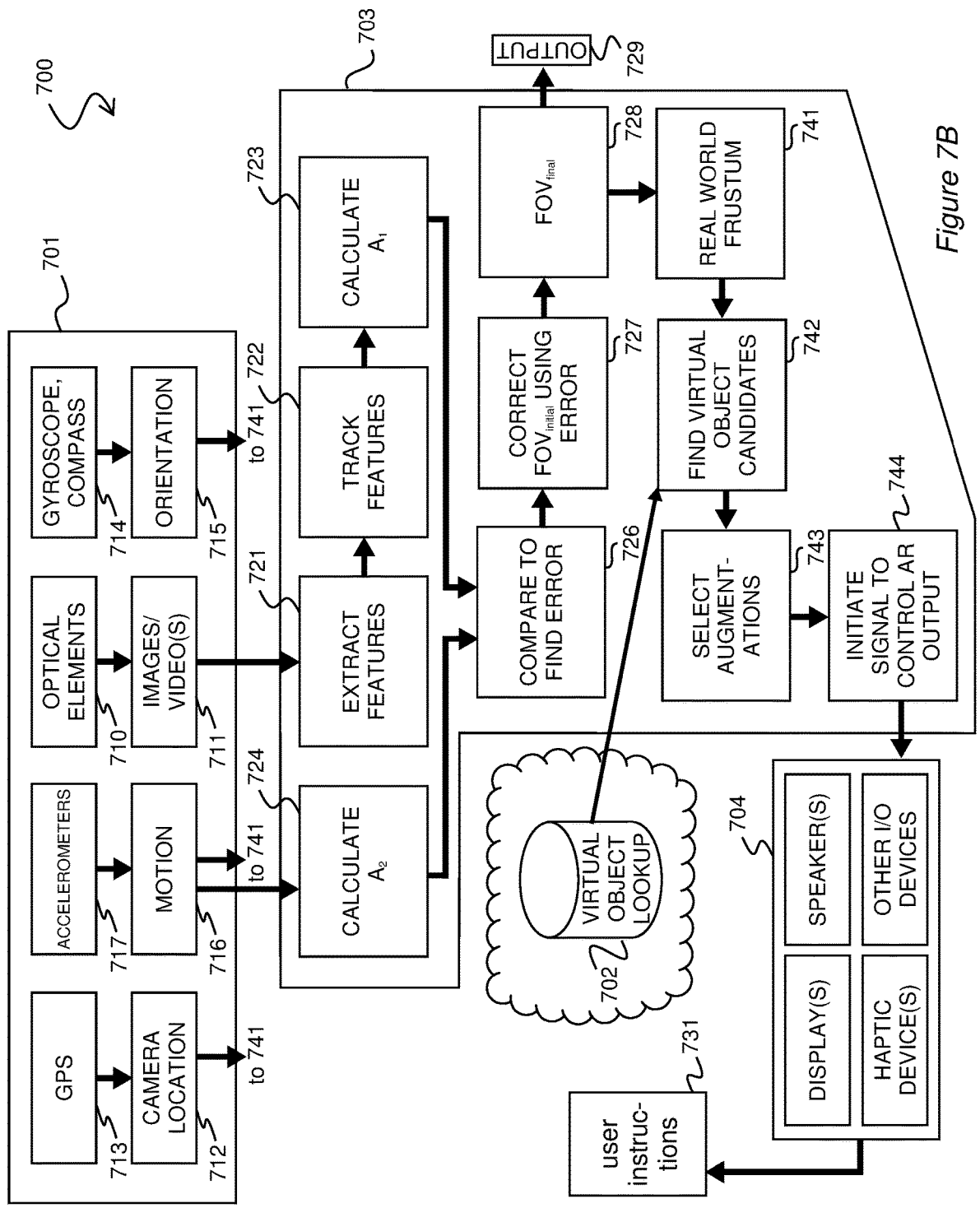
FIG. 7B is a block diagram of an exemplary system and flowchart of an exemplary process for determining field of view of a camera and providing an augmented reality.

FIG. 7B shows an exemplary system 700 used for determining a field of view of a camera of a device 701 and providing an augmented reality with an output device 704. Generally, FIG. 7B includes further exemplary details and features which build upon those already introduced by FIG. 7A. Thy system 700 comprises an input device 701, database 702, processor 703, and output device 704. For convenience and clarity of discussion, each of these and other hardware elements may be referred to in the singular in this description. It should be understood, however, that alternative embodiments may include one or multiple of each hardware element with one or multiple of each other hardware element while maintaining substantially the same core functionality that will now be described. In short, the number of cameras, databases, processors, and output devices may vary, and reference to such hardware elements in the singular should not necessarily be construed as limiting. It should also be understood that other hardware may also be included in a system 700, for instance a power converter, wiring, and input/output interfaces (e.g., keyboard, touchscreen, buttons, toggles, etc.), among others. In a number of exemplary embodiments, the input device 701 and output device 704 are one in the same device (e.g., a smartphone, a dedicated AR device, etc.).

An exemplary camera includes at least one lens and an image sensor, generally represented in FIG. 7B as optical elements 710. The optical elements 710 produce images or video(s) 711. The device 701 further includes other sensors such as but not limited to a GPS unit 713 that gives a camera location 712, and a gyroscope and/or digital compass 714 that provide the camera's orientation 715. Accelerometers 717 are further sensors of the device 701 and are usable to collect or obtain motion data 716. Accelerometers 717 may be linear accelerometers, rotational accelerometers, or some combination thereof. In some embodiments, the sensors that are additional to the optical elements 710 (e.g., GPS 713 and gyroscope/compass 714) may not necessarily be part of the input device 701 but are sufficiently associated with the camera that their outputs are accurate for purposes of describing conditions of the camera (e.g., the camera's location 712 and orientation 715).

Exemplary embodiments of the invention use a limited set of inputs to resolve the problem of determining the field of view of a camera. For system 700 of FIG. 7B, inputs include the images or videos 711 captured by the camera optical elements 710 and motion data 716. To provide an augmented reality, an additional input is virtual object information which may be stored in one or more databases 702. The databases which store data such as virtual object data may be accessible over a network, as indicated by the cloud in FIG. 7B.

In FIG. 7B, blocks 721-728 illustrate an exemplary process for determining the field of view of the camera of device 701 using a processor 703. The steps in FIG. 7B may be performed by a single processor or divided among multiple processors, any one or multiple of which may be part of device 701 (e.g., a VR device itself), part of a remote server, or in some other device that is communicatively coupled with the system 700 (e.g., over a network). While FIG. 7B is described with respect to "a processor 703" for ease of discussion, such processor 703 may be representative of a single processor or multiple processors according to different embodiments. The field of view of the camera of device 701 is referred to as $FOV_{final}$ and is given at block 728. According to some exemplary embodiments, it is possible to determine $FOV_{final}$ from just the images/videos 711 and motion sensor data 716. The exemplary process represented by blocks 721-728 will be described now in connection with FIGS. 8 to 12.

For the following discussion, it should be appreciated that words such as "motion" or "movement" may assume more than one meaning and should be interpreted according to their context. According to exemplary embodiments, the primary and more preferably the only relevant object that is moving is a camera. More specifically, the camera changes position and/or orientation in the reference frame of earth or ground (i.e., the usual default reference frame in kinematics). In contrast, objects viewed by the camera and captured in its video feed are preferably stationary with respect to the earth reference frame. Nevertheless, this disclosure also makes reference to the movement of features, i.e., points of interest in an image or video feed that are tracked across multiple video frames. Features are described as "moving" herein because the features move within a video frame. In other words, features are generally characterized according to the camera frame of reference, rather than the earth frame of reference. Thus, a camera's actual motion (i.e., in the earth frame of reference) will translate to a feature's motion within the camera's video frame (i.e., in the camera frame of reference). As a specific example to illustrate this distinction, consider a user holding a camera so that the video feed of the camera captures a building. When the user pans the camera left or right, the camera moves, and the building remains still. However, in the video feed, the building and features such as the building's corners move within the video frame.

The image/video data 711 captured by the camera of device 701 undergoes image processing at block 721 for feature extraction. The received images/video frames 711 are processed using any one or multiple feature extraction algorithms. The feature extraction algorithms may be, for example, SURF (Speeded Up Robust Features). The feature extraction algorithm yields, for each processed image in the video stream, a list of locations (e.g., pixels) of features. The feature extraction step may be implemented using, for example, a convolutional neural network implemented locally on the electronic device (e.g., smartphone) or via the cloud (e.g., the Google Cloud Machine Learning Engine).

Figure 8:
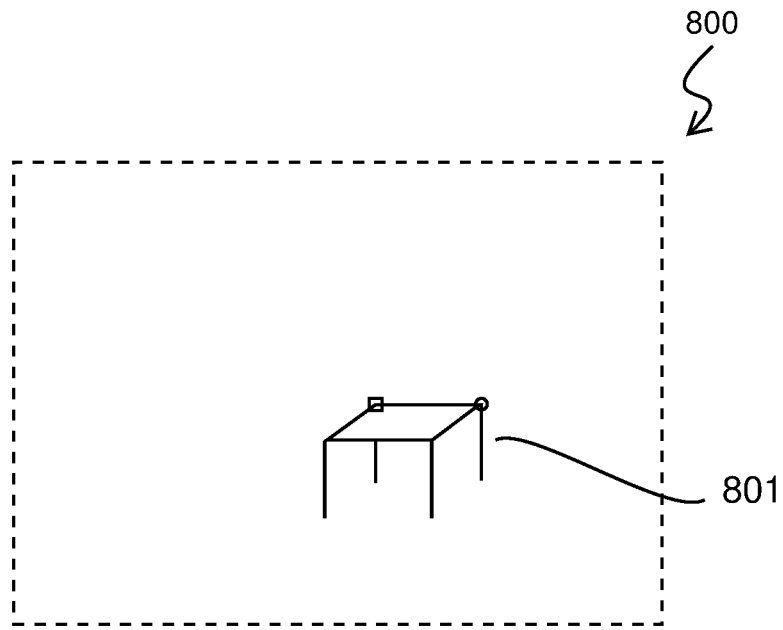
FIG. 8 is a first video frame relating to the process in FIG. 7B.

FIG. 8 shows a video frame 800 that includes an image of a table 801. According to this illustrative example, the feature extraction algorithm executed at block 721 extracts two features, each a respective corner of the table. The extracted features are identified in FIG. 8 by a white circle and a white square, respectively.

An advantageous feature of some embodiments of the invention is the output of instructions (e.g., visually with a display and/or audibly with speakers) to a user as generally represented at block 731 in FIG. 7B. Provision of instructions to a user in physical control of the motion of the device 701 permits constraints to be placed on the motion of the camera (optical elements 710) and thus the image/video data 711 as well as motion data 716.

In some exemplary embodiments, the user may be instructed at block 731 to slowly pan the camera horizontally (left or right) across a scene with few or no moving objects in view. (Horizontal panning is used for horizontal field of view. The user may be instructed to pan vertically (up or down) for vertical field of view.) As discussed above, the motion of the camera may generally be regarded as being with respect to some common frame of reference like earth. So, in this instance, the user is instructed to move the camera with respect to earth while capturing video of objects which are preferably not moving with respect to earth. The user may be prompted to slow down if he or she are moving the camera too fast (detected via motion sensors attached to the camera), and/or prompted to find a scene with fewer moving objects if needed (based on analysis of the motion as described below).

In some exemplary embodiments, image processing at block 721 may involve one or more object recognition algorithms. Any of a variety of image processing software may be used for object recognition at block 721. For instance, image processing may be conducted in some exemplary embodiments using a convolutional neural network. A convolutional neural network comprises computer-implemented neurons that have learnable weights and biases. A convolutional neural network employs a plurality of layers and combines information from across an image to detect an object in the image. The image processing at block 721 may include, for example, targeting, windowing, and/or classification with a decision tree of classifiers. Note that in many instances feature extraction is preferable over object recognition because it is simpler, more efficient, and can result in equally satisfactory results under many circumstances.

Figure 9:
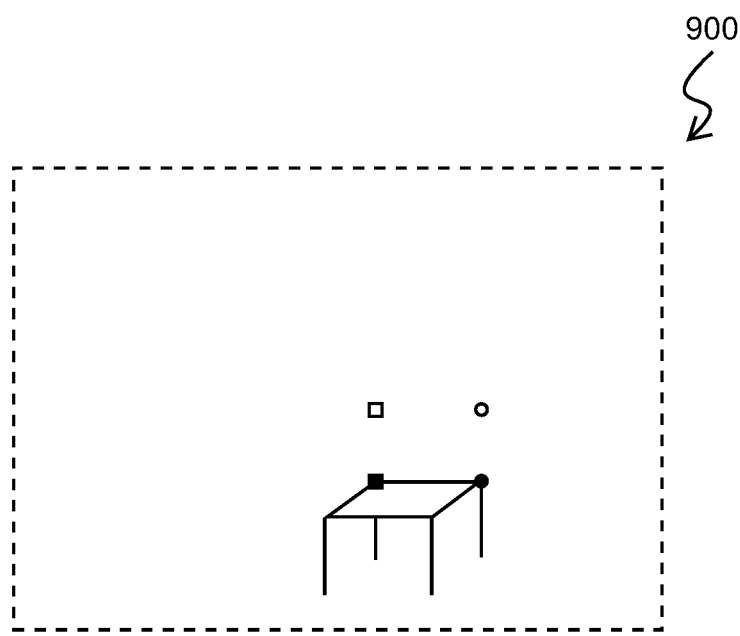
FIG. 9 is a second video frame relating to the process in FIG. 7B.

At block 722, the processor 703 tracks the features extracted at block 721. In practice, feature extraction and tracking may be performed in real time at substantially the same time as new video frames are captured by the optical elements 710 and received by the processor 703. FIG. 9 shows a video frame 900 in which the extracted features of video frame 800 have been cached and new features have been extracted, shown in the figure as a black square and black dot, respectively. Note that the same features are tracked in both frame 800 and frame 900, namely two corners of the table 801.

Features may be tracked from image to image based on simple proximity, and as a result the feature extraction algorithm may be fairly sparse, since the main purpose of the feature extraction is to have a reasonable sample of features (e.g., ten or more features) and not to actually analyze the features further (as would often be done for more complex feature extraction engines). While further analysis is possible, it is advantageous that it is not required, thereby reducing processing demands.

Figure 10:
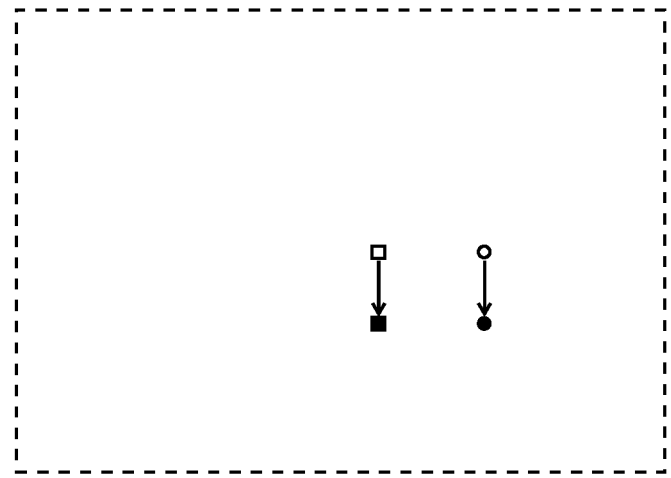
FIG. 10 is a diagram of processing based on the first and second video frames.

As illustrated by FIG. 10, the rate of motion of the extracted features is analyzed by associating features in successive images in the video stream, and noting how far within the image each feature has moved, versus the real time elapsed between the successive images. In FIG. 10, each feature location coordinates in a given image has been paired with the nearest feature coordinates found in the subsequent image to assess motion. This is a simple rate of motion detection technique acceptable for some exemplary embodiments. Other rate of motion detection techniques may also be used based on the video. For instance, an alternative algorithm may be based on SIFT (Scale Invariant Feature Transform—e.g., as described in U.S. Pat. No. 6,711,293, incorporated herein by reference for the express purpose of describing SIFT).

If there is substantial local variation in the speed of motion of the detected features, the user may be instructed (at block 731) to point the camera at a scene with few or no moving objects. If the speed of motion of the detected features shows a regular increasing/decreasing trend from side to side, or from the center to the outside, the user may instructed not to twist or tilt the camera but to instead pan steadily left to right, or up and down. Left-right panning is used to determine the horizontal field of view, and up-and-down panning is used to detect the vertical field of view.

Blocks 723 and 724 are steps that each involves calculation of a value that describes the change in the camera's position or orientation. For the explanation given here, this value will correspond with an angular traverse or angular displacement. However, alternative variables may also be used to characterize the motion in question, for instance angular displacement as a function of time. Conversion between related variables that still describe the change in the camera's position and/or orientation (or the camera's motion) do not affect the underling advantages and functionality of exemplary embodiments.

Despite the fact that steps 723 and 724 both determine values for what is ultimately the same thing—the camera's motion, or change in position/orientation—steps 723 and 724 arrive at their values by different subroutines. The camera's field of view may be expressed as an angle, and for each video frame, the portion of the field of view traversed by a moving feature is a portion of that angle. That portion of the field of view traversed by the feature from frame to frame should be exactly the angle that is output by the accelerometer detection of angular motion. If it is not, the estimate of the field of view may be revised to match the accelerometer output, as will be described in greater detail below.

Figure 11:
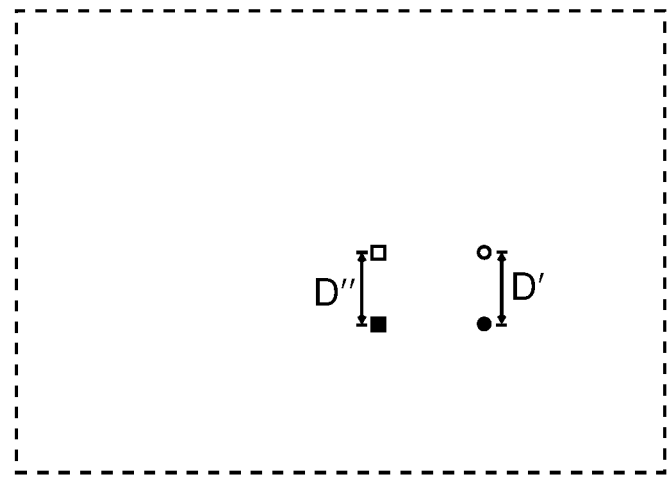
FIG. 11 is a diagram of further processing based on the first and second video frames.

At block 723, a first value $A_1$ is determined for the angle through which the tracked features moved within the camera frame. (Note that although the camera is technically the object that is moving, using the camera's frame as the frame of reference means that the tracked features "move" while the camera inherently remains "stationary" by virtue of being the frame of reference.) To calculate the first value $A_1$, the processor 703 measures the distance moved by each tracked feature between frames. According to the illustrated example, two features are tracked and therefore two distances are measured (D' and D'') for the change between frames 800 and 900, as illustrated in FIG. 11. D' is the distance traveled by the feature illustrated with a circle point, and D'' is the distance traveled by the feature illustrated with a square point.

Figure 12:
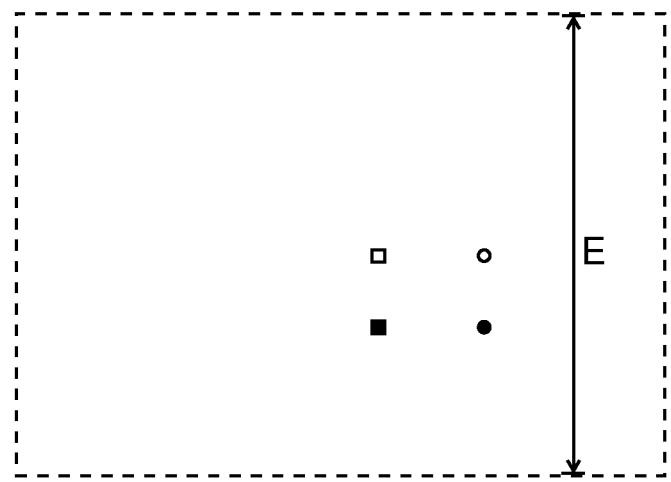
FIG. 12 is a diagram of still further processing based on the first and second video frames.

As illustrated in FIG. 12, the processor 703 further measures the distance E from the top to bottom of the frame. This distance should be the same in all frames. Note that for a horizontal field of view determination, the distance E is taken as the width of the frame instead of the height of the frame. All the distances (e.g., D', D'', and E) may be expressed as a number of pixels. Distances having been measured, the average distance moved by all the tracked features, $D_{avg}$, may be computed as:

$$D_{avg} = \frac{D' + D''}{2}$$

As discussed above, although this example involves just two tracked features, exemplary embodiments may track any number of features (e.g., ten or more features) in which case the average distance may be given by:

$$D_{avg} = \frac{D_1 + D_2 + \ldots + D_n}{n}$$

where n is the number of tracked features (e.g., n≥10). In this illustrative example the distances are vertical displacements because the calculations are performed for vertical field of view. For determination of a horizontal field of view, the distances measured are horizontal displacements.

The measured/calculated distances $D_{avg}$ and E and an initial value of $FOV_{initial}$ (which may be arbitrarily selected) are usable together to calculate a first estimate of the angle traversed by the features within the frame of reference of the camera. Recalling that the camera is being treated as the frame of reference, the proportion of the total frame distance E linearly traversed by tracked features is equal to the proportion of the total field of view (FOV) angularly traversed by the tracked features. This relationship can be expressed as follows:

$$\frac{A_1}{FOV_{initial}} = \frac{D_{avg}}{E}$$

$$A_1 = FOV_{initial} * \frac{D_{avg}}{E},$$

where $A_1$ is the angle traversed by the features within the frame of reference of the camera and $FOV_{initial}$ is an initial value for the field of view, FOV. The initial value is assigned as an initial "best guess" value for FOV of the real camera of device 701. This initial value, $FOV_{initial}$, may be set to the value that is empirically measured as correct, e.g., for the most common smartphone on the market. The initial value is not critical to the functioning of the invention. Generally, it is adequate that the initial value be set within 50% of the correct value. Accordingly, an initial value such as 40° is generally adequate for smartphones.

Next, a second angle value, $A_2$, is determined at block 724. The second angle value $A_2$ is calculated from motion data 716 that was generated by accelerometers 717. For up and down motion, simple processing of the data from linear accelerometers (present in virtually all smartphones) can easily detect the direction of "up" for each image in the video stream (due to the easily detected effect of gravity), versus the direction of the camera. From the changes in this relationship of "up" to the camera direction, the angular rate of motion can be simply calculated. For side to side motion, more complex but still well-known methods of determining the angular motion of the camera based on attached rotational accelerometers may be used. An exemplary method may assess the instantaneous angular acceleration of the system and maintain a reckoning of the current angular speed of the system, and then track that speed over time to accurately estimate the change in the direction of the overall system.

While the exemplary processes described herein primarily discuss camera movement according to vertical and horizontal panning, camera movement may take other forms and paths in various embodiments. Vertical and/or horizontal components of motion which is not purely vertical or horizontal may be extracted as needed. For instance, in situations where a user is employing the invention to adjust the vertical FOV, and the user moves a phone's camera diagonally, embodiments may extract only the vertical portion of that motion and use that in estimating the FOV via image motion. Similarly, it is simple in the same scenario to extract only the vertical portion of the physical motion of the phone as reported by the accelerometer sensors. In a different scenario where the user is trying to adjust the horizontal FOV, it is similarly simple to extract the horizontal portion of the horizontal motion reported by the accelerometer sensors and also separately calculated from feature detection in successive frames.

At this stage of the process within system 700, the processor 703 has two angle values that should be equivalent. Namely, it has value $A_1$ from block 723 and value $A_2$ from block 724.

At block 726, the angle (or angular rate of motion) estimate from the video stream and the angle (or angular rate of motion) estimated from the accelerometers are compared. In other words, at block 726, the values $A_1$ and $A_2$ are compared. If $FOV_{initial}$ was perfectly accurate, $A_1$ and $A_2$ will be equal. Generally, however, $A_1$ and $A_2$ will disagree by some amount of error. $FOV_{initial}$ is therefore corrected at block 727 using the magnitude of the error between $A_1$ and $A_2$. The correction is the negative of the error. For example, if $A_1$ is 10% larger than $A_2$, then $FOV_{initial}$ is reduced by 10%. As another more detailed example, assume the original estimate of the vertical field of view is 50 degrees. The user is instructed to slowly pan the camera downward. Feature detection tracks four feature points across two successive images in the video stream. On average, those four feature points move down one tenth of the vertical extent of the image. So from the video stream, the estimate is that the angular speed of motion is 5 degrees from frame to frame. But the accelerometers in this example are processed to determine that the camera actually moved down by 6 degrees. This means that one tenth of the vertical extent of the image is actually 6 degrees, so the vertical field of view should be corrected to 60 degrees.

Correcting $FOV_{initial}$ based on the error between $A_1$ and $A_2$ gives a final measure of the FOV of the camera, $FOV_{final}$, at block 728. If desired, the final determined value for the FOV of the camera, $FOV_{final}$, can be output as data at block 729 (e.g., output to memory storage). In addition or as an alternative, output at block 729 may comprise or consist of initiating a signal that controls a sensory output (e.g., auditory, visual, and/or tactile output) of an output device 704 based on $FOV_{final}$.

While the example explained in connection with FIGS. 8-12 has focused on a two-dimensional application, the same principles apply to 3D contexts. The 3D case simply involves performing the correction twice, once in the vertical dimension and once in the horizontal dimension. The corrected and final FOV of the camera, $FOV_{final}$, is now ready to be used as the effective virtual field of view in a virtual world.

The field of view value, $FOV_{final}$, given at block 728 is but one characteristic that describes the perspective of camera of the device 701. A second characteristic is the camera's position (block 712). A third characteristic is the camera's orientation (block 715). In short, the perspective of the camera includes the field of the view of the camera, the position of the camera, and the orientation of the camera. Position and orientation may be referred to collectively as the pose of the camera. The orientation of the camera 715 may be obtained from sensors such as a gyroscope and digital compass 714. Typical mobile devices on the market at least as of 2017 are typically equipped by their manufacturers with GPS, gyroscopic sensors, and a digital compass. These sensors are typically readily available to software applications including third party applications running on the mobile devices. However, of the key characteristics of camera perspective of a mobile device, the FOV is a characteristic which is not exposed to software applications. This deficiency gives rise to the problem addressed by exemplary embodiments herein which determine FOV in order to complete the assessment of augmented reality perspective.

Based on the location 712, the field of view 728, the orientation 715, and assumptions about the near and far field limits (e.g., predetermined values for near and far field limits), a 3D real world frustum is determined at block 741. This real world frustum is applied to a virtual world at block 742 using virtual world data from database 702. Virtual objects which are inside the frustum are found as candidates for augmentation. The selection of augmentations based on the virtual object candidates occurs at block 743 and may involve one or more criteria including, for example, user option selections and the relationships between different virtual objects. For instance, the processor 703 may determine which of the virtual objects obscure parts of each other based on the frustum in the virtual world. At block 744, a signal is initiated to control the augmented reality output of an output device 704. The initiated signal contains information for the augmentations selected at block 743. In embodiments where the processor 703 is arranged remotely from the output device 704 (e.g., if the processor is part of a cloud server), the initiated signal is transmitted over a network (e.g., the Internet) to reach the output device 704. In embodiments where the processor 703 is part of or at least co-located with the output device 704, the initiated signal may simply be conveyed over hardwired connections. After the device 704 has the signal, the selected augmentations are provided as one or more of auditory, visual, or tactile output (i.e., sensory output) at the VR device 704. Significantly, the augmentations have appropriate and accurate spatial relationships with real world objects owing to the fact that the augmented reality is based on the $FOV_{final}$ that was determined via blocks 721 to 728.

It should be appreciated that augmentations that are or include auditory and tactile elements still involve virtual objects that need to be identified with accurate spatial relationships with respect to real world objects. For example, a VR device that is a HMD may be used to give a guided tour of a real place like New York City. When a user looks at the Empire State Building with the HMD, the device may announce through a speaker "You are looking at the Empire State Building." This announcement is an auditory augmentation corresponding with a virtual object that has a location in the virtual world which matches the location of the actual Empire State Building in the real world. Without a determination of the field of the view of the VR device (more specifically the FOV of its camera or cameras), the device conceivably could announce to a user that the Empire State Building is visible when in fact it is just outside of the actual field of view. In short, the same problem that was described in connection with FIGS. 2-6 applies here. The virtual object X is represented to the user as an augmentation that is the auditory announcement "You are looking at the Empire State Building." The VR device 404 must accurately determine the FOV (be it $FOV_n$ or $FOV_w$) in order to make a correct decision as to whether or not to output the announcement to the user.

Finding virtual object candidates and selecting corresponding augmentations for output (blocks 742 and 743 of FIG. 7B) may be performed according to what is disclosed in U.S. patent application Ser. No. 15/436,154, which is incorporated herein by reference.

Returning to database 702, virtual objects are stored, updated, and manipulated as data within one or more databases 702. The virtual objects have their own existence separate from how they are displayed, visualized, haptically buzzed, or otherwise output by an output device. So, generally speaking, a virtual object has its own characteristics, and then, based on those characteristics and on the real and the virtual environment, an exemplary augmented reality system determines what is presented to the user. An augmentation may be displayed (or otherwise provided) if, and only if, the system determines that a given virtual object should be apparent to the user given the viewing device's pose and field of view in the real world and therefore its pose and field of view in the virtual world.

The characteristics of those virtual objects (stored in the database along with the geometric aspects of the virtual representation) determine what baseline augmentation to provide and markers/indicators/tweaks may be performed on the baseline augmentation. In general, the augmentation that is output (e.g., displayed) depends on all of the virtual characteristics of the virtual objects that are made perceptible given the current perspective of the current image. As a comparative analogy to illustrate this point, a car may give haptic feedback (vibration) to the steering wheel when the operator drives over the centerline of the road without using a turn signal. There is no visual augmentation at all, and yet it is a visual part of the real world sensory input that drives the determination that the haptic feedback will be presented. If the operator indicates his intent to change lanes by tapping the turn signal arm, a characteristic flag of the system is set, and the haptic augmentation is not presented to the user, who in that case perceives nothing from the augmentation system.

According to a feature of some embodiments, virtual objects may obscure other virtual objects in the current real world perspective. The obscuring object may cause the obscured object to not be represented via augmentations, even if the obscuring object is itself not shown with any augmentations. For example, a user may see a real world image in which no augmentations are shown at all, despite the fact that two virtual objects are contained geometrically within the field of view. A first virtual object (which for illustrative purposes will be called virtual object A) would be shown with an augmentation if not otherwise obscured. A second virtual object (which will be called virtual object B) entirely obscures A given the field of view, but virtual object B may itself not be currently shown as an augmentation. In this way the virtual objects that represent a virtual world suitable for augmenting a real world view consist of two basic classes of objects. The first class is associated with augmentations. The second class is not associated with augmentations but still interact with the other virtual objects either by obscuring them visually or through other possible interactions (e.g., an augmentation of an object of the first class might be a different color if the first class virtual object is near a virtual object of the second class).

Embodiments of the invention may comprise computer readable storage media that are tangible devices that can retain and store instructions for use by an instruction execution device like processor 703. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or schematic diagrams of methods, apparatus (systems), and computer program products according to embodiments of the invention. It will be understood that each block of the flowchart illustrations and/or block diagrams, and different combinations of blocks in the flowchart illustrations and/or block diagrams, may be implemented by or with the use of computer readable program instructions and by or with one or a plurality of processors and supporting hardware, software, and firmware. The functions described in connection with FIGS. 7A and 7B, for example, may be provided by non-transitory computer readable instructions which, when executed by a processor or processors, cause that processor or processors to perform the described steps.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. This may have the effect of making a general purpose computer a special purpose computer or machine. A "processor" as frequently used in this disclosure may refer in various embodiments to one or more general purpose computers, special purpose computers, or some combination thereof. Computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

An "output device", as used herein, is a device capable of providing at least visual, audio, audiovisual, or tactile output to a user such that the user can perceive the output using his senses (e.g., using her eyes and/or ears). In many embodiments, an output device comprises at least one display, at least one speaker, or some combination of display(s) and speaker(s). The output device may also include one or more haptic devices. A suitable display (i.e., display device) is a screen of an output device such as a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally only the augmentations that are actively shown or output by the device. Visual augmentations are in any case superimposed on the direct view of the real world environment, without necessarily involving the display of any of the original video input to the system. Output devices and viewing devices may include or be accompanied by input devices (e.g., buttons, touchscreens, menus, keyboards, data ports, etc.) for receiving user inputs. Some devices may be configured for both input and output (I/O).

Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location information may use any suitable geodetic datum, WGS84 or alternatives thereto.

As used herein, "user" typically refers to a human interacting with or using an embodiment of the invention.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method for automated determination of field of view of a camera, comprising
   determining, by one or more processors, a first value that describes a change in a camera's position or orientation by tracking features across a plurality of images or video frames, wherein the images or video frames originated from the camera, wherein the camera includes at least one lens with a focal length and an image sensor with a sensor size;
   determining, by the one or more processors, a second value that describes a change in the camera's position or orientation using motion sensor data corresponding with the camera;
   determining a field of view (FOV) of the camera from a comparison of the first and second values, wherein the FOV is expressed as a single angle measure which is constant for a given value of the focal length and a given value of the sensor size; and
   initiating a signal for controlling one or more of auditory, visual, and tactile output by an output device based on the determined field of view,
   wherein the field of view determination is performed in an absence of a priori knowledge of the FOV of the camera, the focal length, or the sensor size.

2. The method of claim 1, further comprising a step of extracting the features tracked for the first determining step from the images or video frames by image processing with the one or more processors.

3. The method of claim 1, further comprising a step of providing the one or more of auditory, visual, and tactile output with an output device.

4. The method of claim 1, further comprising a step of providing instruction to a user to pan the camera to the side or up and down while the plurality of images or video frames are captured and the motion sensor data is collected.

5. A method for augmented reality, comprising
   determining, by one or more processors, a first value that describes a change in a camera's position or orientation by tracking features across a plurality of images or video frames, wherein the images or video frames originated from the camera, wherein the camera includes at least one lens with a focal length and an image sensor with a sensor size;
   determining, by the one or more processors, a second value that describes a change in the camera's position or orientation using motion sensor data corresponding with the camera;
   determining a field of view (FOV) of the camera from a comparison of the first and second values, wherein the FOV is expressed as a single angle measure which is constant for a given value of the focal length and a given value of the sensor size;
   selecting one or more virtual objects to represent as augmentations to the one or more images or videos, wherein the selection is based on the determined field of view; and
   initiating a signal for controlling an augmented reality output by an output device using the one or more selected virtual objects,
   wherein the field of view determination is performed in an absence of a priori knowledge of the FOV of the camera, the focal length, or the sensor size.

6. The method of claim 5, further comprising a step of extracting the features tracked for the first determining step from the images or video frames by image processing with the one or more processors.

7. The method of claim 5, further comprising
   determining a real world frustum for the camera based on the determined field of view, the location of the camera, and an orientation of the camera, and
   applying the real world frustum to a virtual world, wherein the virtual world contains virtual objects and a virtual landscape that corresponds with a real world landscape,
   wherein the step of selecting selects from virtual object candidates which are inside the frustum applied to the virtual world.

8. The method of claim 5, further comprising a step of providing instruction to a user to pan the camera to the side or up and down while the plurality of images or video frames are captured and the motion sensor data is collected.

9. A system for automated determination of field of view of a camera, comprising
   one or more processors configured to execute instructions which cause the one or more processors to
      determine a first value that describes a change in a camera's position or orientation by tracking features across a plurality of images or video frames, wherein the images or video frames originated from the camera, wherein the camera includes at least one lens with a focal length and an image sensor with a sensor size;
      determine a second value that describes a change in the camera's position or orientation using motion sensor data corresponding with the camera;
      determine a field of view (FOV) of the camera from a comparison of the first and second values, wherein the FOV is expressed as a single angle measure which is constant for a given value of the focal length and a given value of the sensor size; and
      initiate a signal for controlling one or more of auditory, visual, and tactile output by an output device based on the determined field of view,
   wherein the field of view determination is performed in an absence of a priori knowledge of the FOV of the camera, the focal length, or the sensor size.

10. The system of claim 9, further comprising
    a camera configured to capture images or videos which are transmitted to the one or more processors; and
    an output device for providing the one or more of auditory, visual, or tactile output based on the determined field of view.

11. The system of claim 9, wherein the one or more processors are further caused to perform a step of providing instruction to a user to pan the camera to the side or up and down while the plurality of images or video frames are captured and the motion sensor data is collected.

12. An augmented reality system, comprising
    one or more processors configured to execute instructions which cause the one or more processors to
       determine a first value that describes a change in a camera's position or orientation by tracking features across a plurality of images or video frames, wherein the images or video frames originated from the camera, wherein the camera includes at least one lens with a focal length and an image sensor with a sensor size;

determine a second value that describes a change in the camera's position or orientation using motion sensor data corresponding with the camera;

determine a field of view (FOV) of the camera from a comparison of the first and second values, wherein the FOV is expressed as a single angle measure which is constant for a given value of the focal length and a given value of the sensor size; and select one or more virtual objects to represent as augmentations to the one or more images or videos, wherein the selection is based on the determined field of view, and initiate a signal for controlling an augmented reality output by an output device using the one or more selected virtual objects, wherein the field of view determination is performed in an absence of a priori knowledge of the FOV of the camera, the focal length, or the sensor size.

13. The system of claim 12, further comprising a camera configured to capture images or videos which are transmitted to the one or more processors; and an output device for providing the augmented reality output using the one or more selected virtual objects.

14. The system of claim 12, wherein the one or more processors are further caused to perform a step of providing instruction to a user to pan the camera to the side or up and down while the plurality of images or video frames are captured and the motion sensor data is collected.

\* \* \* \* \*